Patented May 2, 1944

2,348,013

UNITED STATES PATENT OFFICE 2,348,013

DYESTUFFS OF THE ANTHRAQUINONE SERIES

Ralph N. Lulek, Wilmington, Del., and Edwin C. Buxbaum, Swarthmore, Pa., assignors to E. I. du Pont de Nemours & Company, Wilmington, Del., a corporation of Delaware No Drawing. Application September 24, 1940, Serial No. 358,102

10 Claims. (Cl. 260—367)

This invention relates to the preparation of new dyestuffs of the anthraquinone series and more particularly to the preparation of new dyes of the dianthrimide sulfonic acid series which dye wool in desirable gray shades.

In general, the dyes of the anthraquinone series which are employed for the dyeing of wool and related fibers are considered as simple substitution derivatives of anthraquinone of relatively low molecular weight since they contain only one anthraquinone group. While in the prior art sulfonation derivatives of higher molecular weight compounds of the anthaquinone series such as dianthrimides and a few trianthrimides have been described as dyes for wool it has been found that in general these dyes are of little or no value for this purpose, for they show poor affinity for the fiber and therefore poor building up properties or are deficient in fastness properties.

While there are a number of dyestuffs in the anthraquinone series which dye wool in gray shades those most commonly employed are dyes which dye directly in other colors and which are converted to grays by chroming. Considerable work has been done in an attempt to find new dyestuffs of the anthraquinone series which will dye fiber directly in gray shades and which will exhibit good fastness properties.

It is therefore an object of this invention to produce new dyestuffs of the anthraquinone acid wool series which will dye wool and related fibers directly in gray shades, which will exhibit good dyeing and fastness properties and which show relatively little change in color on chroming.

We have found that very desirable gray dyestuffs may be produced in the anthraquinone series by condensing 1-arylamino-6-halogen anthraquinones with a diaminoanthraquinone or an amino-alkylamino-anthraquinone which carries the amino groups in the 1,4 positions and then sulfonating the resulting condensation product.

These new dyestuffs are characterized in that they contain an arylamine group which may be readily sulfonated; they carry one free amino or alkylamino group; and they are alpha beta di-anthrimides.

The 1-arylamino-6-halogen anthraquinone can be readily prepared from 1,6-dichloro- or dibromo-anthraquinone by condensing it with one mole of an arylamine such as aniline, toluidine, xylidine, naphthylamines, etc., in which the arylamine group is of the benzene or naphthylamine series. The condensation of the 1-arylamine-6-halogen anthraquinone with the diamino anthraquinone is effected by any of the usual methods for preparing dianthrimide compounds. The condensation of the dianthrimides may be effected in organic solvents such as naphthalene, orthodichlorobenzene, hexalin, etc. The dianthrimides may be sulfonated by the usual sulfonating agents. Sulfuric acid of from 100% to 65% oleum may be employed and the sulfonation may be carried out at temperatures of from 25 to 140° C., depending on the strength of the acid. In general, the weaker acids require the higher temperatures. Other sulfonating agents such as chlorosulfonic acid may be used. Under the mild conditions employed the sulfonation is believed to be primarily in the arylamine group as distinguished from the anthraquinone nucleus, and only one sulfonic acid group is introduced. The 1-arylamino-6-halogenanthraquinones may contain further substituents such as nitro, amino, methyl, methoxy, or sulfhydryl groups, etc. Either the 1-arylamino-6-chloroanthraquinone or the 1-arylamino-6-bromoanthraquinone compounds may be used in the condensation.

The following examples are given to illustrate the invention. The parts used are by weight.

Example 1

Twenty-two and three-tenths (22.3) parts of 1-anilino-6-chloro-anthraquinone are reacted with 15 parts of 1:4-diamino-anthraquinone in 300 parts of naphthalene in the presence of 35 parts of potassium acetate and 0.5 part of copper acetate at 210-215° C. for 8 hours. When the formation of acetic acid has stopped and the reaction has been completed, the mass is cooled to 140° C. and diluted with 600 parts of solvent naphtha. The diluted condensation is then allowed to cool to 40° C. over a period of six hours. It is then filtered. The filter cake is washed with 300 parts of solvent naphtha and finally with alcohol and hot water and is dried at 100-110° C.

The product formed has the following constitution:

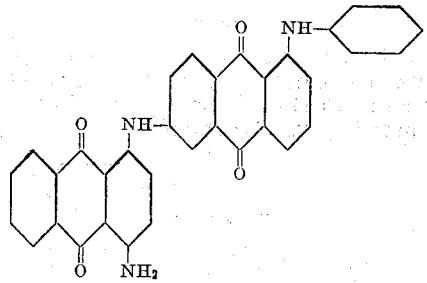

Twenty-five (25) parts of the above product are dissolved over a period of one-half hour at 30-40° C. in a mixture of 125 parts of sulfuric acid monohydrate and 125 parts of 25% oleum. The temperature is gradually raised to 60-65° C. and held there until sulfonation is complete.

The sulfonated reaction mass at a temperature below 25° C. is then poured slowly into a mixture of 2500 parts of ice and water. The precipitated dyestuff is filtered off, washed acid free with brine and dried at 100–110° C.

It dyes wool from an acid bath in reddish-gray shades which change very little on chroming and exhibit good fastness to light and fulling.

*Example 2*

Seventy-two and three-tenths (72.3) parts of 1-(2':5'-dimethyl-anilino)-6-chloro-anthraquinone are reacted with 47.6 parts of 1:4-diamino-anthraquinone in 1200 parts of naphthalene in the presence of 120 parts of potassium acetate and 1.2 parts of copper acetate at 210–215° C. for 8 hours. When the condensation is finished, it is diluted at 140° C. with 2400 parts of solvent naphtha. The diluted condensation is held at 100–110° C. for two hours and then allowed to cool slowly to room temperature over a period of 8 hours. It is then filtered at 40° C. and the crystalline cake washed with 600 parts of solvent naphtha and finally with alcohol and hot water and dried. The product corresponds to the following formula:

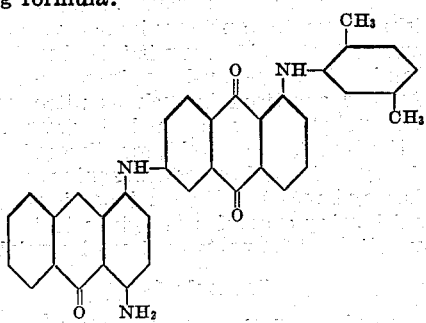

Twenty-five (25) parts of the above compound are dissolved in 250 parts of 12.5% oleum at 25–30° C. over a period of one hour. The temperature is then raised to 60–65° C. and there are then added 50 parts of 65% oleum. The temperature is held at 60–65° C. until sulfonation is completed as evidenced by the complete solution of one drop of the sulfonation mass in 20 cc. of water. It is then poured into a mixture of 2500 parts of ice and water. The precipitated dyestuff is filtered off, washed acid free with brine and dried at 100–110° C.

From an acid bath it dyes wool in gray shades which are very little changed on chroming. It exhibits good fastness properties especially light fastness which is excellent.

*Example 3*

If in Example 2 there is substituted 1-p-toluidino-6-chloro-anthraquinone in place of 1-(2':5'-dimethyl-anilino)-6-chloro-anthraquinone, the following compound is obtained:

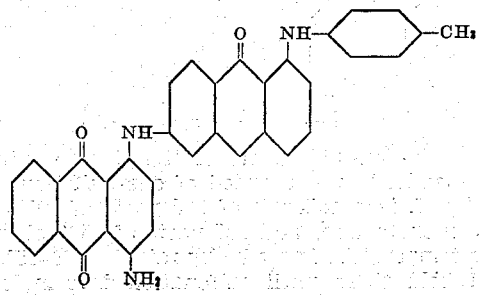

which when sulfonated gives dyestuffs which dye wool in fast gray shades.

*Example 4*

Thirty-eight and four-tenths (38.4) parts of 1-naphthyl-amino-6-chloro-anthraquinone (prepared from the condensation of alpha-naphthyl-amine with 1:6-dichloro-anthraquinone) are reacted with 23.8 parts of 1:4-diamino-anthraquinone in 620 parts of naphthalene in the presence of 62 parts of potassium acetate and one part of copper acetate at 215–220° C. for 8 hours. The condensation is cooled to 140° C. when the reaction is over and diluted with 1240 parts of solvent naphtha. It is then cooled to 100° C. and held there for 2 hours. It is then allowed to cool slowly to room temperature and filtered at 30–40° C. The cake is washed with additional solvent naphtha, alcohol and hot water and then dried at 100–110° C. The product obtained corresponds to the following formula:

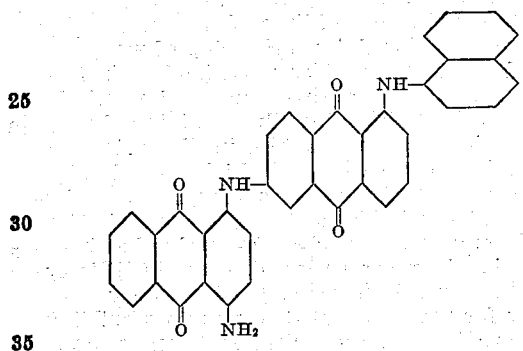

Upon sulfonation of the above compound a gray wool dyestuff is obtained which exhibits good fastness properties.

Any one of a large variety of 1-arylamino-6-chloro compounds can be employed. The arylamino group may be further substituted by nitro, amino, methoxy, sulfhydryl or other groups. Bromine may be substituted for chlorine in the 1-arylamino-6-chloro-anthraquinone component. The anthraquinone nucleus may also be further substituted.

The presence of an alkyl group such as methyl or ethyl, etc., on the amino radical does not materially change the shade or dyeing properties of the products.

Condensation may be effected by any of the usual methods using as an acid binder either sodium or potassium acetate or carbonates. Any suitable organic solvent may be used in the condensation such as the chloro-benzenes, hexalin or other high boiling solvents.

The sulfonation may be effected in acid from 100% $H_2SO_4$ to 65% oleum at temperatures from 25° C.–140° C., depending on the strength of the acid. In general, the weaker acids require the higher temperatures and vice versa. Other sulfonating agents like chlorosulfonic acid may be used.

We claim:

1. 1-arylamino-6-(alpha-anthraquinonyl-amino) anthraquinones which carry in the 4' position a radical of the class consisting of the amino and the alkylamino radicals, their sulfonic acids and the alkali metal salts of said sulfonic acids; in which the sulfonic acid group is in the arylamino radical and in which the arylamino radical is of the benzene and naphthalene series.

2. 1-arylamino-6-(alpha-anthraquinonyl-amino) anthraquinones which carry in the 4' position an amino radical, their sulfonic acids and the alkali metal salts of said sulfonic acids, in which the sulfonic acid group is in the arylamino radical and in which the arylamino radical is of the benzene and naphthalene series.

3. 1 - phenylamino - 6 - (4'-amino - anthraquinonylamino)-anthraquinone, its water soluble sulfonic acid and the alkali metal salts of such sulfonic acid.

4. 1 - p - xylidino - 6 - (4' - amino - anthraquinonylamino)-anthraquinone, its water soluble sulfonic acid and the alkali metal salts of such sulfonic acid.

5. 1 - alphanaphthylamino - 6 - (4' - aminoanthraquinonylamino)-anthraquinone, its water soluble sulfonic acid and the alkali metal salts of such sulfonic acid.

6. The alkali metal salts of 1-arylamino-6-(alpha - anthraquinonylamino) anthraquinone sulfonic acids which carry in the 4'-position a radical of the class consisting of the amino and the alkylamino radicals, in which the sulfonic acid group is in the arylamino radical and in which the arylamino radical is of the benzene and naphthalene series.

7. The alkali metal salts of 1-arylamino-6-(alpha - anthraquinonylamino) anthraquinone sulfonic acids which carry in the 4'-position an amino radical, in which the sulfonic acid group is in the arylamino radical and in which the arylamino radical is of the benzene and naphthalene series.

8. The alkali metal salts of 1-phenylamino-6 - (4' - amino - anthraquinonylamino) - anthraquinone sulfonic acid.

9. The alkali metal salts of 1-p-xylidino-6-(4'-amino - anthraquinonylamino) - anthraquinone sulfonic acid.

10. The alkali metal salts of 1-alphanaphthylamino-6-(4'-amino-anthraquinonylamino) - anthraquinone sulfonic acid.

RALPH N. LULEK.
EDWIN C. BUXBAUM.